United States Patent [19]

Fries

[11] 3,984,314

[45] Oct. 5, 1976

[54] PROCESS FOR SELECTIVE REMOVAL AND RECOVERY OF CYANIDE VALUES BY ION EXCHANGE

[75] Inventor: William Fries, Southampton, Pa.

[73] Assignee: Rohm and Haas Company, Philadelphia, Pa.

[22] Filed: Apr. 22, 1974

[21] Appl. No.: 463,649

[52] U.S. Cl. .......................... 210/30 R; 210/37 B; 210/38 B; 423/24
[51] Int. Cl.² ........................................ B01D 15/04
[58] Field of Search .................. 210/30, 32, 37, 38, 210/30 R, 37 B, 38 B; 423/24, 29

[56] References Cited

UNITED STATES PATENTS

| | | | |
|---|---|---|---|
| 2,753,258 | 7/1956 | Burstall | 210/37 |
| 3,056,648 | 10/1962 | Childers | 423/24 |
| 3,429,694 | 2/1969 | Lower | 423/24 |
| 3,650,949 | 3/1972 | Hager | 210/37 |
| 3,656,893 | 4/1972 | Sloan | 423/24 |
| 3,681,210 | 8/1972 | Zievers | 210/37 |
| 3,788,983 | 1/1974 | Fries | 210/37 |
| 3,791,817 | 2/1974 | Cadwell | 423/29 |

FOREIGN PATENTS OR APPLICATIONS

| | | | |
|---|---|---|---|
| 698,706 | 11/1964 | Canada | 423/29 |

OTHER PUBLICATIONS

"Cyanogen Compounds," Herbert E. Williams, (1948), Arnold and Co., London, pp. 113-115.

*Primary Examiner*—Charles N. Hart
*Assistant Examiner*—Ernest G. Therkorn

[57] ABSTRACT

This invention relates to the purification of industrial effluents containing cyanide ions, and cyanide precursors like acetone-cyanohydrin. More particularly, the invention relates to the purification of such effluents by utilizing a complexing compound followed by treatment with an anion exchange resin and optionally cation exchange resin to remove the cyanide complexes. The cyanide values are recovered from the resin by acid regeneration.

2 Claims, No Drawings

PROCESS FOR SELECTIVE REMOVAL AND RECOVERY OF CYANIDE VALUES BY ION EXCHANGE

BACKGROUND OF THE INVENTION

There is a widespread problem of cyanide pollution in industrial waste streams, particularly with chemical, steel and electroplating industries. These streams are aqueous, and generally containing large quantities of dissolved salts, but relatively low levels of cyanaide, which are still well above pollution standards.

No present methods are known to be able to reduce the cyanide level to extremely low levels (less than 0.5 ppm). The classical approach is its oxidation to cyanates, but this is complicated by the inability to perform this oxidation upon complexed cyanides, caused by indigenous transition metal ions and the non-selectivity of the oxidation. This generates a requirement to oxidize everything at an extremely high chemical usage.

Industry is making major and expensive investments in minimizing extreme pollution as governmental authorities adopt and enforce stricter water quality standards. The only commercially acceptable technique involving separation of cyanide ions is handicapped by its limited utility in the presence of concurrently disposed soluble salts.

In many industrial uses involving cyanide disposal, interfering salts are frequently admixed in the effluent to a sewer. For example, cyanide is involved in the manufacture of acrylic monomers. Not uncommonly, because of the high salt levels, complete ion removal including cyanide ion removal by ion exchange is impractical. A method of selective removal of the cyanide ion is often needed.

The preparation, isolation and identification of complex metal cyanides have been known for many years. The best summary is the Text, "Cyanogen Compounds," by Herbert E. William (1948), E. Arnold and Co., London. The adsorption of these complexes from aqueous solution has also reputedly been performed with anion exchange resins, both weakly and strongly basic. In one paper, a two-bed system is described, in which the second bed has CuCN precipitated within the matrix. The stated purpose was to recover the waste cyanide from gold mining processes. The first bed, of Amberlite IRA-400 (an anion exchange resin), removes all the existing complexes of cyanide (gold, silver, nickel, zinc, and copper); the second bed adsorbs the free cyanide by the reaction:

$$Resin^+ + CuCN + HCN \rightarrow [Resin^+ \ Cu(CN_2^-)]$$

The first bed is regenerated with $H_2SO_4$ which causes a simple destruction of the metal cyanides. Regeneration of the second bed is suggested with hot dilute $H_2SO_4$

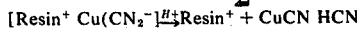

After many cycles the first bed must be treated with $Fe_2(SO_4)_3$ to remove built-up CuCN.

Another reference advocates the addition of excess $Zn^{+2}$ ion to the cyanide stream, with the subsequent adsorption of all cyanide complexes by a single bed of strongly basic resin. Specific regenerants are mentioned for each metal complex, and following an $H_2SO_4$ step, 6% $NH_3$ is recommended for periodic copper elution.

It has been established however that the quantity of $NH_3$ needed to keep nickel and zinc cyanide in solution is uneconomical and the leakage of the zinc complex is excessive.

Papers relating to the treatment of cyanide wastes from the plating industry are also abundant. No evidence of adding transition metal ions to these streams to complex-free cyanide are suggested.

The prior art further disclosed the concept of adsorbing iron cyanide complexes on strongly basic resins, but this was discarded after regeneration was found impossible for the exemplary resin used.

Thus, the specialized teachings of the art reveal only a limited utility for metal complexing, justifiable where the complexed metal is intrinsically valuable. This does not lend itself to cyanide recovery on a pollution abatement basis.

It has now been discovered that upon complexing of the cyanide with certain transition metals, preferably Copper II at high pH, the resulting complexes were found to be anionic in nature, which are selectively adsorbable by quaternary ion exchange resins. The reactions can be represented by the following equations:

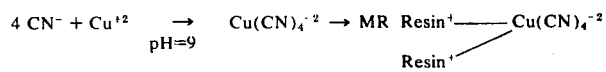

Since the resin complex is unstable under acidic conditions, the following regeneration may be expected:

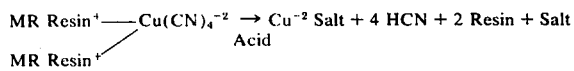

According to the present invention, it has therefore been conceived and demonstrated that by pre-treatment of the cyanide ion, even in the presence of other salts and organic moieties which form a material that interferes with ordinary cyanide adsorption on an ion exchange resin, cyanide can be efficiently removed from industrial effluents.

The removal process involves the addition of certain transition metal ions, initially in excess of a stoichiometric amount, to the cyanide containing stream. This is done just as readily in the presence of high background salt levels. The pH of the combined solution is maintained within the prescribed range of 7 or greater, which is necessary to form the metallocyanide anionic complex, by the addition of an alkalizing agent such as free $NH_3$. This complex is conveniently adsorbed on an anion exchange resin having the properties taught herein. This is optionally followed by contacting the treated stream with a cationic exchange resin to remove any remaining excess of the transition metal, which would otherwise form a substitute pollutant in the effluent.

Furthermore, through the judicious selection of the polymeric adsorbents, both being ion exchange resins, and through the utilization of a special regeneration system, it has been determined that most of the adsorbed cyanide and transition metal can be desorbed as a concentrated solution, permitting ultimate disposal or reuse of the cyanide ion. The recovery of the valuable transition metal is possible, and lower operating costs through recycling of the recovery regenerant. Although one normally would expect regeneration to be accomplished using an alkaline regenerant solution, it was discovered that such a regeneration technique does not operate satisfactorily. However, regeneration with an acidic solution provides surprisingly successful results. While the regenerant solution may be any acidic solution such as, for example, nitric acid or sulfuric acid, improved results are obtained with hydrochloric acid. A preferred regenerant solution comprises an 8 N hydrochloric acid regenerant solution although other concentrations of HCl may of course also have utility.

According to the present invention, a process is provided for selectively separating soluble cyanide ions, and their complexes found in aqueous streams by an optional 3-step process involving:
1. contacting the effluent containing cyanide ions with a stoichiometric excess of copper ion to complex all of the free cyanide;
2. adjusting the effluent pH to favor complexing;
3. passing the effluent through a mass or bed of anion exchange resin and optionally thereafter passing the effluent through a cation exchange resin;
4. desorbing the anion exchange resin with a strong acidic regenerant solution.

The anion exchange resin having utility in the process of this invention may be of any of the many anion exchange resins which are commercially available. The resin may be weakly basic or quaternary in nature. It may have a gelular or MR structure. Useful aromatic anion exchange resins are those comprising styrene crosslinked with from 0.5 to 10% of DVB monomer. Aliphatic resins such as acrylic may be crosslinked with divinylbenzene or any other crosslinking monomer or crosslinking monomeric system. Trimethylol propane trimethacrylate (TMPTMA) has been found to be a quite acceptable crosslinker, particularly when used in combination with divinylbenzene.

Anion exchange resins prepared by conventional polyamines and polyhalides or condensations of epichlorohydrin with polyhalide having internal crosslinking have also been found to be useful in the process of the present invention. The optional cation exchange resin may similarly be either gelular or macroreticular in structure and be either strongly or weakly acidic in functionality. A particularly preferred embodiment is a methacrylic acid monomer crosslinked from one to 20% of DVB, having carboxylic or sulfonic functionality. Preferred cation resins are gelular in nature. If the process comprises the optional cation exchange step, the process may be performed in using separate columns of anion and cation exchange resins or alternatively a Monobed system may be found more suitable. Cation exchange resins having utility in the process are described in U.S. Pat. No. 2,340,111 and are commercially available as Amberlite IRC-50 or IRC-84 from Rohm and Haas Company. Other useful resins are apparent to the practitioner.

The following examples are given as illustrative only of the present invention without, however, limiting the invention to the specific details of the examples.

EXAMPLE 1

A synthetic cyanide waste effluent is prepared to contain 50 ppm HCN and 5000 ppm $H_2SO_4$. To this solution is added 50 ppm $Cu^{+2}$ (as $CuSO_4$), which results in a 23 ppm excess of copper. The pH of the solution is then increased to 9 with ammonia. A dual column treatment system is prepared which consists of the 20 ml column of resin A followed by a 10 ml column of resin B. The solution is passed through the system and an overall flow rate of 1 gal/ft$^3$ -min. After 650 bed volumes of solution, no cyanide is detected in the effluent. Additionally, no copper is detected as present in the effluent either.

Resin B in the above example is Amberlite IRC-50.

Synthesis of Resin A a. An aqueous phase is made up with 1,018 parts of water, 2 parts of polyacrylic acid dispersant, 0.9 parts of gelatin and the pH adjusted to about 10 to 10½. The aqueous phase is charged to a 3 liter, 3-neck flask fitted with stirrer, reflux condenser and nitrogen sweep. An organic phase consisting of 664 parts of styrene, 36.2 parts of 55% divinylbenzene and 6.8 parts of benzoyl peroxide is added to the flask, stirring commenced at about 140–150 RPM with formation of a suitable dispersion. The reactor (flask) is heated to about 80°–82°C. and held for about 3 hours at that temperature. Polymerization is completed by heating to 95°C. for a short time and the resultant slurry is filtered, washed and dried. Copolymer fractions in the −20 +70 U.S. Standard Screen size are separated. The copolymer analyzes about 97% styrene and about 3% divinylbenzene.

b. Chloromethylation and amination are in a conventional manner; thus, the product of a) above is slurried in a mixture of ethylene dichloride and chloromethyl methyl either in a suitable flask and heated to about 30°–32°C. and a catalyst such as Al $Cl_3$ in additional chloromethyl methyl ether ($CH_3$-O-$CH_2Cl$) is added with stirring. After reaction is complete at 35° to 40°C., the reaction mixture is cooled to about 5°C. and the excess aluminum chloride and chloromethyl ether is decomposed. The copolymer beads are next aminolyzed with anhydrous trimethylamine at a temperature ranging initially from 50°C. for about 1 to 1.5 hours and then raising the temperature to 30°–35°C. and holding there for about 3 hours. After removal of excess amine, the slurry is cooled, washed with water, drained on a Buchner funnel, and packaged in a moist condition. The resultant strong base ion exchange resin shows an adsorption capacity of 60 mg of CN per ml of resin.

The following table gives the percentage cyanide and copper recovered from the resin A of Example 1 loaded with Cu(CN)$_2^-$ with the prescribed regeneration and illustrates the efficacy of a strongly acidic regenerant solution.

| | | Recovery of Adsorbed Substances | |
|---|---|---|---|
| Regenerant | Temperature °C. | % Cyanide | % Copper |
| 8 N HCl | 25 | 100 | 81 |
| 6 N HCl | 25 | 100 | 74 |
| 2 N HCl | 25 | 100 | 10 |

-continued

| Regenerant | Temperature °C. | Recovery of Adsorbed Substances | |
|---|---|---|---|
| | | % Cyanide | % Copper |
| 2 N H$_2$SO$_4$ | 70 | 64 | 0.5 |

I claim:

1. A method for removing cyanide values from an industrial waste stream having relatively low levels of cyanide which comprises:

a. adding to the waste stream a stoichiometric excess of copper ions to complex all of the free cyanide;
    b. maintaining the waste stream pH at 7 or greater to favor complexing of the cyanide;
    c. passing the waste stream containing complexed cyanide through a mass or bed of only quaternary ammonium ion exchange resin to remove cyanide values from the stream; and
    d. regenerating the resin when exhausted with a strongly acidic regenerant solution.

2. A method as claimed in claim 1 which additionally includes a cationic exchange step subsequent to removal of the cyanide values from the waste stream.

* * * * *